US006131099A

United States Patent [19]

Johnson et al.

[11] Patent Number: 6,131,099
[45] Date of Patent: Oct. 10, 2000

[54] PRINT AND MAIL BUSINESS RECOVERY CONFIGURATION METHOD AND SYSTEM

[75] Inventors: Jeffrey M. Johnson, Wheaton; D. G. Dracup, Grayslake, both of Ill.

[73] Assignee: Moore U.S.A. Inc., Grand Island, N.Y.

[21] Appl. No.: 08/962,835

[22] Filed: Nov. 3, 1997

[51] Int. Cl.[7] .......... G06F 17/30

[52] U.S. Cl. .......... 707/104; 705/10; 705/410; 358/1

[58] Field of Search .......... 707/104, 10, 203, 707/9, 101, 103, 204, 205; 364/479; 705/410, 408, 411, 26, 8; 395/113, 114; 369/34; 358/437, 444, 1, 14, 15; 711/100, 170; 380/24, 4; 101/71

[56] References Cited

U.S. PATENT DOCUMENTS

| | | | |
|---|---|---|---|
| 4,803,634 | 2/1989 | Ohno et al. | 700/213 |
| 5,051,914 | 9/1991 | Sansone et al. | 364/478 |
| 5,067,305 | 11/1991 | Baker et al. | 53/411 |
| 5,222,018 | 6/1993 | Sharpe et al. | 705/30 |
| 5,450,317 | 9/1995 | Lu et al. | 705/10 |
| 5,570,291 | 10/1996 | Dudle et al. | 364/468 |
| 5,625,757 | 4/1997 | Kageyama et al. | 395/113 |
| 5,712,787 | 1/1998 | Yeung | 705/10 |
| 5,768,132 | 6/1998 | Cordery et al. | 705/410 |
| 5,813,009 | 9/1998 | Johnson et al. | 707/104 |
| 5,889,935 | 3/1999 | Ofek et al. | 714/6 |
| 5,987,441 | 11/1999 | Lee et al. | 705/401 |
| 6,058,378 | 5/2000 | Clark et al. | 705/37 |

*Primary Examiner*—Wayne Amsbury
*Assistant Examiner*—Thu-Thao Havan
*Attorney, Agent, or Firm*—Nixon & Vanderhye PC

[57] ABSTRACT

A print and mail recovery system configuration method enables the efficient configuration of a customized executable plan to ensure continuation of critical mailing applications in the event of a man-made or natural disaster. The system is configured by storing recipient data and form data in respective databases and documenting at least one printing process, at least one finishing process, and at least one delivery process in accordance with company derived parameters. The system can be customized to accommodate varying printing processes based on varying data categories, respectively, as well as varying finishing processes and delivery processes.

12 Claims, 2 Drawing Sheets

PRINT AND MAIL BUSINESS RECOVERY CONFIGURATION METHOD AND SYSTEM

BACKGROUND OF THE INVENTION

The present invention relates to a print and mail business recovery configuration method and system and, more particularly, to a configuration method and system for providing executable print and mail recovery solutions for critical mail communications in the event of a disaster.

Management's legal and fiduciary responsibility for preparing viable business continuation plans has long been recognized. Recently, however, recovery concerns have been greatly heightened due to dramatic experiences with natural and man-made disasters, particularly the increased likelihood of domestic terrorism.

Some businesses have robust recovery plans in place for their transaction processing or data center operations. Few companies, however, have an executable plan in place that ensures continuation of critical mailing applications which are regulated or affect cashflow.

SUMMARY OF THE INVENTION

A primary reason for this gap in business continuation planning is that viable commercial print and mail recovery systems have not previously existed in the marketplace. In accordance with the present invention, there is provided a print and mail recovery configuration method and system, which uses dedicated equipment and personnel resources. Information can be received directly from an internal or external data center recovery site, and the system is configured to enable full service mail processing during a disaster.

In accordance with one aspect of the invention, there is provided a print and mail recovery system configuration method including (a) storing recipient data in a fixed database, (b) storing form data in a form database, (c) documenting at least one printing process in accordance with predetermined printing parameters, (d) documenting at least one finishing process in accordance with predetermined finishing parameters, and (e) documenting at least one delivery process in accordance with predetermined delivery parameters. The step of storing form data in a form database may be practiced by one of copying the form data from a data source or creating the form data based on data compatibility. The printing process documenting step may be practiced by documenting a first printing process to accommodate data falling into a first data category and documenting a second printing process to accommodate data falling into a second data category. The finishing processes and delivery processes can also accommodate the first and second category data, respectively, with varying functional parameters. In addition, the method includes the steps of predetermining a format for variable data for application to the form data stored in the form database, and documenting a variable data transfer process for transferring the variable data into a variable data database.

In accordance with another aspect of the invention, there is provided a print and mail recovery system configured in accordance with the method of the invention.

BRIEF DESCRIPTION OF THE DRAWINGS

These and other aspects and advantages of the present invention will be described in detail with reference to the accompanying drawings, in which.

DETAILED DESCRIPTION OF PREFERRED EMBODIMENTS

The print and mail business recovery system according to the present invention provides an executable plan that ensures continuation of critical mailing applications, such as those that are regulated or affect cash flow. Company data is first divided into at least two categories including fixed data and variable data. Fixed data including customer names, addresses, account numbers, forms and the like is transferred and stored in at least one database as part of the system's configuration prior to any disaster. Data relating to customer names, addresses, account numbers and the like is recipient data, which is stored in a fixed database. This recipient data can be updated at regular intervals dictated by the rate of change in the recipient data. Other fixed data may include, for example, form data representing company forms for the fixed and variable data, fonts, electronic overlay data, logo data, signature data and at least one data processing program. The form data is stored in a form database similarly during the system configuration and is also updated as necessary or at regular intervals. The form data may be copied from a data source, such as a data storage means supplied by the company, or may be created depending on data compatibility.

Figure 1:
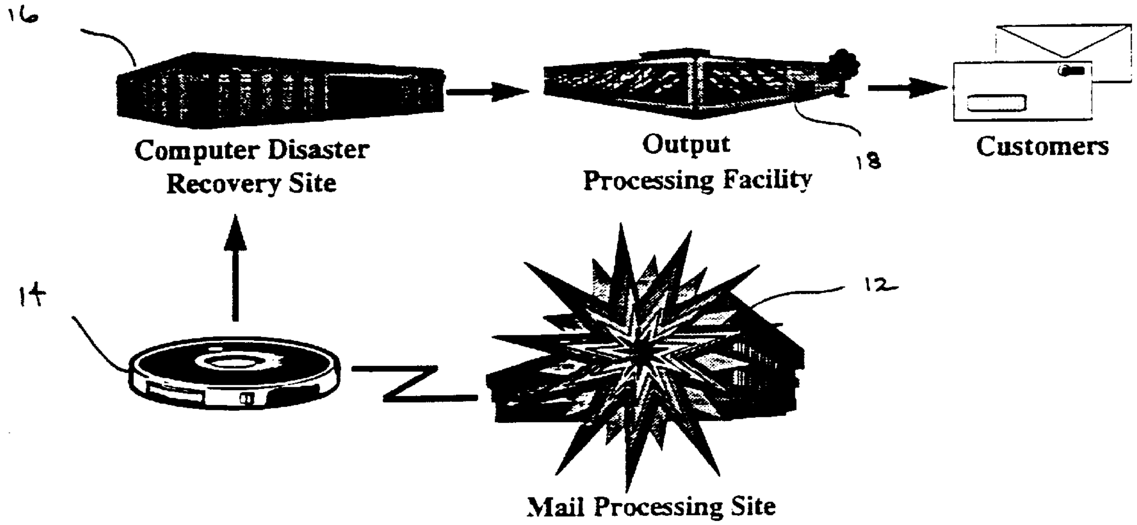
FIG. 1 is a flow schematic for the business recovery solution according to the present invention.
Figure 2:
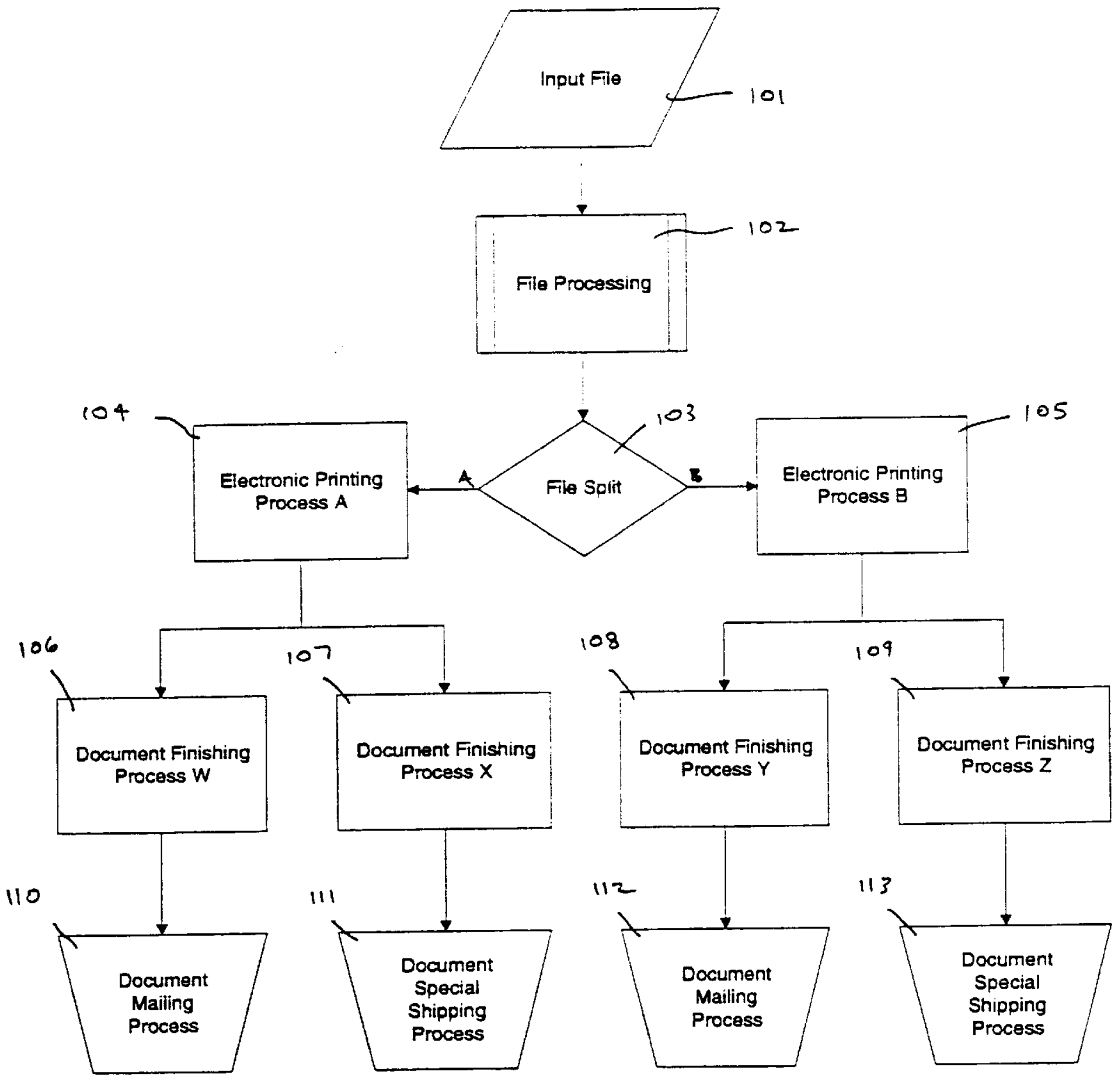
FIG. 2 is a flow diagram illustrating the process for configuring the print and mail recovery system.

With reference to FIG. 1, in the event of a disaster in a company's mail processing site 12, pertinent information 14 is received directly from a company's internal or external data center recovery site or from a third-party data center recovery site 16. The information is received in an output processing facility 18 for electronic print, insert and mail applications during the disaster. The method for configuring the print and mail recovery system according to the present invention will be described with reference to FIG. 2.

In step 101 a preferred input file type configuration is documented based on company data compatibility and equipment. That is, in step 101, the print and mail recovery system is configured for receiving company variable data in a company preferred format. In addition, a variable data transfer process is documented for transferring the variable data in a variable data database. For example, the variable data may be transferred to the recovery processing facility via a telecommunications system or via tape or cartridge or the like. Variable data includes account information or the like that varies on a mailing-to-mailing basis. For example, this data may include monthly statements, account updates, payroll checks, payroll EFTs, transaction confirmations, account payable checks, billing statements and the like. Once the format of the variable data is configured for processing, a file processing operation is documented in step 102 wherein audit controls are performed to ensure that the proper output is achieved. In addition, quality control numbers are added to the output for integrity purposes.

In step 103, the file data is split based on predetermined parameters such as the number of pages to be processed, printer fonts, the company form being used, residential versus corporate recipient, delivery method, dollar amount, printing process, finishing process, delivery process and the like. For purposes of the present description, the file data will be split into data falling into a first data category A and data falling into a second data category B, respectively. In steps 104 and 105, a printing process is configured for the first data category and the second data category, respectively. The data records can be further divided in accordance with predetermined finishing parameters and requirements. Examples of such parameters and requirements include whether inserts are to be added to the mailing, whether the mailing requires folding, binding requirements based on the number of pages in the mailing and whether other finishing processes are to be performed such as cutting, drilling, laminating and wrapping. Thus, in steps 106–109, various finishing processes are documented based on the predetermined finishing parameters incorporating the parameters of the data falling into the first data category (steps 106 and 107) and the data falling into the second data category (steps 108 and 109).

Various mailing and shipping processes are documented in steps 110–113 based on predetermined delivery parameters incorporating the respective finishing processes as well as the data falling into the first and second data categories, respectively. Examples of the document mailing and shipping processes include the means of delivery, such as by the U.S. Postal Service or a private delivery company.

The system thus configured is capable of providing electronic printing and mailing of critical company communications during a temporary business disaster. Coupled with the use of dedicated equipment and personnel resources, the configuration method and system according to the present invention enables rapid and efficient set up of a custom print and mail business recovery plan.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A print and mail recovery system configuration method comprising:

(a) storing recipient data in a fixed database;

(b) storing form data in a form database;

(c) documenting at least one printing process in accordance with predetermined printing parameters;

(d) documenting at least one finishing process in accordance with predetermined finishing parameters; and (e) documenting at least one delivery process in accordance with predetermined delivery parameters.

2. A method as claimed in claim 1, wherein step (b) is practiced by one of copying the form data from a data source or creating the form data based on data compatibility.

3. A method as claimed in claim 1, wherein step (c) is practiced by documenting a first printing process to accommodate data falling into a first data category and documenting a second printing process to accommodate data falling into a second data category.

4. A method as claimed in claim 3, further comprising establishing the first data category to include data that is printable on N or fewer pages and establishing the second data category to include data that is printable on more than N pages, where N is an integer greater than 0.

5. A method as claimed in claim 3, further comprising establishing the first data category to include data that is for printing in a first font and establishing the second data category to include data that is for printing in a second font, different from the first font.

6. A method as claimed in claim 3, further comprising establishing the first data category to include data that is printable on a first form and establishing the second data category to include data that is printable on a second form, different from the first form.

7. A method as claimed in claim 3, wherein step (d) is practiced by documenting a first finishing process for the first category data and documenting a second finishing process for the second category data.

8. A method as claimed in claim 7, wherein step (e) is practiced by documenting a first delivery process in accordance with the first finishing process for the first category data and documenting a second delivery process in accordance with the second finishing process for the second category data.

9. A method as claimed in claim 3, wherein step (e) is practiced by documenting a first delivery process for the first category data and documenting a second delivery process for the second category data.

10. A method as claimed in claim 1, further comprising predetermining a format for variable data for application to the form data stored in the form database.

11. A method as claimed in claim 10, further comprising documenting a variable data transfer process for transferring the variable data into a variable data database.

12. A print and mail recovery system configured in accordance with the method of claim 1.

* * * * *